United States Patent
Wilkerson et al.

(10) Patent No.: US 11,960,602 B2
(45) Date of Patent: Apr. 16, 2024

(54) ANALYZING HARDWARE DESIGNS FOR VULNERABILITIES TO SIDE-CHANNEL ATTACKS

(71) Applicant: Cycuity, Inc., San Jose, CA (US)

(72) Inventors: Kristoffer Wilkerson, San Francisco, CA (US); Alric Althoff, San Jose, CA (US); Nicole Fern, San Francisco, CA (US); Vijay Seshadri, San Jose, CA (US); Jason K. Oberg, Redwood City, CA (US)

(73) Assignee: Cycuity, Inc., San Jose, CA (US)

( * ) Notice: Subject to any disclaimer, the term of this patent is extended or adjusted under 35 U.S.C. 154(b) by 172 days.

(21) Appl. No.: 17/387,823

(22) Filed: Jul. 28, 2021

(65) Prior Publication Data

US 2022/0035912 A1 Feb. 3, 2022

Related U.S. Application Data

(60) Provisional application No. 63/059,923, filed on Jul. 31, 2020.

(51) Int. Cl.
*G06F 21/55* (2013.01)
*G06F 21/54* (2013.01)
*G06F 21/87* (2013.01)

(52) U.S. Cl.
CPC ............ *G06F 21/556* (2013.01); *G06F 21/54* (2013.01); *G06F 21/554* (2013.01); *G06F 21/87* (2013.01)

(58) Field of Classification Search
CPC ...... G06F 21/54; G06F 21/554; G06F 21/566; G06F 21/87
See application file for complete search history.

(56) References Cited

U.S. PATENT DOCUMENTS

| | | | |
|---|---|---|---|
| 10,289,873 B2 | 5/2019 | Oberg et al. | |
| 10,558,771 B2 | 2/2020 | Blair et al. | |
| 2006/0098814 A1* | 5/2006 | Al-Khoraidly | H04L 9/3066 380/28 |
| 2009/0175441 A1* | 7/2009 | Boscher | G06F 7/723 380/28 |
| 2016/0140340 A1* | 5/2016 | Walters | G06F 21/556 726/22 |
| 2019/0005173 A1* | 1/2019 | Blair | G06F 21/87 |
| 2019/0230113 A1* | 7/2019 | Al Faruque | H04L 63/1433 |
| 2021/0026994 A1* | 1/2021 | Tehranipoor | G06F 30/343 |

* cited by examiner

*Primary Examiner* — William S Powers
(74) *Attorney, Agent, or Firm* — Fish & Richardson P.C.

(57) ABSTRACT

Methods, systems, and apparatus, including computer programs encoded on computer storage media, for analyzing hardware designs for vulnerabilities to side-channel attacks. One of the methods includes receiving a request to analyze a device hardware design for side-channel vulnerabilities in the device after being manufactured. Physical characteristics data is obtained representing one or more physical characteristics of the device based on the device hardware design. Information flow analysis is performed to identify one or more signals of interest corresponding to digital assets. From the physical characteristics data and the one or more signals of interest, data representing potentially vulnerable signals in the device hardware design is generated. A leakage model is generated for the potentially vulnerable signals that quantifies one or more leakage criteria for one or more structures of the device hardware design.

18 Claims, 4 Drawing Sheets

ANALYZING HARDWARE DESIGNS FOR VULNERABILITIES TO SIDE-CHANNEL ATTACKS

CROSS-REFERENCE TO RELATED APPLICATIONS

This application claims priority to U.S. Provisional Application Ser. No. 63/059,923, filed on Jul. 31, 2020, the disclosure of which is incorporated herein by reference in its entirety.

BACKGROUND

This specification relates to analyzing designs of electronic devices for vulnerabilities to physical side-channel attacks (PSCAs).

Physical side-channel attacks (PSCAs) are a pervasive threat to the safety and security of microelectronics. In this specification, physical side-channels (PSCs) are physically detectable emanations from an electronic device that can be processed to reveal information about the state of the device. PSCs can include electromagnetic emanations, thermal variations, acoustic emissions, power consumption, or any correlated quantities resulting from measurements of the physical surroundings or connections of an electronic device with surrounding infrastructure. PSCs can be distinguished from microarchitectural side-channels, which arise from logical properties of the design of an electronic circuit, instead of inherent interactions with the physical world.

Countermeasures to PSCA vulnerabilities often require design changes, yet detecting these vulnerabilities is currently only feasible post-silicon, long after the design is finalized and when further changes are generally impossible. Changes to a hardware design become increasingly expensive as development progresses, with late-stage changes being orders of magnitude more costly than those made concurrent to register-transfer level (RTL) and firmware implementation. Additionally, many PSCA vulnerabilities only manifest when running a full software/hardware stack.

It is possible to generate coarse-grained estimates of physical side-channel leakage before a design is fabricated. However, pre-silicon estimates of physical quantities, e.g. power consumption, are expensive to compute for real-world hardware designs that can have thousands or millions of components. Estimating side-channel leakage pre-silicon requires modeling device physics and computing estimates of physical quantities, which is orders of magnitude slower than post-silicon device measurement.

SUMMARY

This specification describes how a system can reduce the complexity of generating pre-silicon traces of possible side-channel leakages. The system can use information flow analysis to filter out signals and time windows that are not relevant for side-channel analysis. This smaller data set containing only signals and time windows relevant for side-channel analysis can also be used to reduce the complexity of the PSCA vulnerability detection computation, which can use measured or estimated traces.

Particular embodiments of the subject matter described in this specification can be implemented so as to realize one or more of the following advantages. By incorporating both information flow analysis and simulated physical characteristics, PSCA vulnerabilities can be isolated much more precisely in a way that is highly advantageous for hardware design. In addition, the techniques described below provide computational advantages because a computer system no longer needs to simulate the physical characteristics of all components on a chip. This is particularly beneficial for real-world hardware designs, which might include millions of components. An additional advantage of techniques described below is that the data regarding PSCA vulnerabilities may be used by hardware designers to mitigate these vulnerabilities at the earliest possible phase of the hardware manufacturing process, thereby saving time and resources. In many cases this will make it possible to identify and mitigate issues that would be impossible to fix post-silicon and which may lead to product recalls or a weakening of the security posture of microelectronics that are critical to modern systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

To analyze a design H for PSCA vulnerabilities it is advantageous to first isolate signals in the design where side-channel leakage may occur. This specification describes how information flow tracking methodologies can be used to collect data regarding which signals in a design may receive information from signals marked as information sources, and when the signals may receive this information in operation. This specification will describe how these techniques can be employed as primary and secondary filters. As a primary filter they can be used to identify signals that may carry confidential information in an electronic circuit, allowing a subset of signals that may carry confidential information to be extracted from signals available in a description of the circuit. As a secondary filter these techniques can be used to identify temporal windows when during the functioning of an electronic circuit a signal or plurality of signals may carry tagged or confidential information. The primary and secondary filter can, for example, include the technique of gate-level information flow tracking (GLIFT) to filter at a gate-level granularity, register transaction-level information flow tracking (RTLIFT), or techniques employed by TaintHLS to track information dynamically in simulation, emulation, after post-silicon tapeout, or in an instantiation of the circuit in a field-programmable gate array (FPGA). The primary and secondary filters can both use a single technique or each use multiple techniques. The resulting aggregate listing of signals and time ranges when confidential information may be carried on them will be referred to in this specification as a "tainted signal list."

Once signals or assets in a design are marked as information sources, the information flow tracking model can be subjected to techniques based on, but not limited to, structural analysis, simulation, formal solvers, and digital emulation to generate temporal and structural data regarding which signals may carry information from information sources. Signals belonging to the tainted signal list are important for PSCA vulnerability analysis as they indicate whether or not the signal contains information from the assets we are tracking and because the vast majority of physical emanations occur due to PSC effects from these signals during device operation.

In this specification, an "asset" is a digital value of interest used by a hardware design. Typically, assets are values that are to be protected from physical side-channel leakage. For example, an asset can be a cryptographic key used by a chip to encrypt or decrypt sensitive information for processing at runtime. As another example, assets can include proprietary weights of a machine learning model that were generated from extensive and highly expensive training in a datacenter. These are both examples of digital values that a hardware designer would like to protect from physical side-channel attacks.

To isolate PSCA-relevant information, a system can use the tainted signal list to filter signals and time ranges which do not contain information from the information sources, or in combination with a threshold to filter signals that contain information in varying degrees. This can be achieved by using the tainted signal list as an input to the step measuring/estimating the design's physical emanations or as a post-processing of the design's physical data. The result after filtering is a set of signals and their values over time that are relevant to PSCs. In this specification, this set of data will be referred to as a Leakage Model. The Leakage Model can quantify leakage criteria, which can include a time window and a value for signals in the tainted signal list, for structures of the hardware design. PSCA-relevant information can then be extracted based on Leakage Model characteristics.

The Leakage Model can be weighted using any appropriate weight function. For example, the Hamming distance of signals (the discrete time-derivative) can serve as a surrogate for physical measurements. For each signal in the design, a higher weight within the Leakage Model can be assigned to a signal at time t if information may be present on the signal and the Hamming distance between the value carried by the signal at time t differs from its value at time t−1.

Other types of Leakage Models can also be used. For example, an empirically derived physical model based on measurements of a device or class of devices can be used as can weighting coefficients alone or in conjunction with the Hamming distance or other Leakage Model approaches.

The Leakage Model resulting from the filtering operations provides information with increased utility over prior approaches to determining PSCA vulnerabilities in a hardware design.

Figure 1:
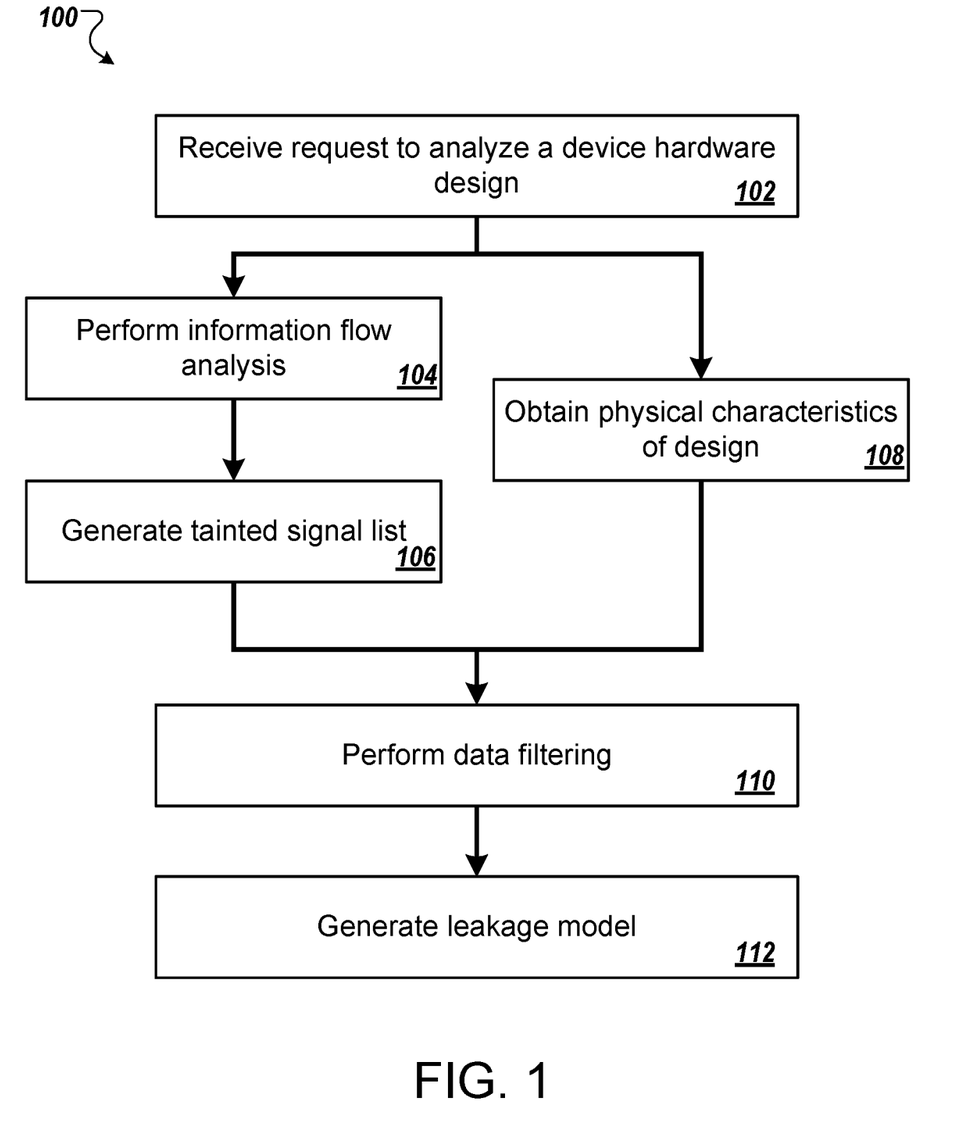
FIG. 1 is a flowchart of an example process 100 for generating a Leakage Model from physical design characteristics and information flow analysis.

FIG. 1 is a flowchart of an example process 100 for generating a Leakage Model from physical design characteristics and information flow analysis. FIG. 1 illustrates side-channel leakage detection using post-processing of data, an example technique in which the information flow analysis is used to filter the physical design characteristics. For convenience, the process will be described as being performed by a system of one or more computers.

The system receives a request to analyze a device hardware design (step 102) for side-channel vulnerabilities in the device after being manufactured.

The system performs information flow analysis (step 104). The system creates an information flow model for the design. The system can label assets of interest for PSCA vulnerability in the information flow model.

The system generates a tainted signal list (step 106). The system analyzes the information flow model to extract a list of what signals, over time, are carrying information from labeled assets. The temporal list of signals containing information flow may be referred to as the "tainted signal list."

The system obtains physical characteristics (step 108). The system gathers data, either an estimation or a collection of physical measurements ("traces"), about the design.

The system performs data filtering (step 110). Using the tainted signal list, the system filters the estimation or collection of physical measurements. Data filtering isolates the design signals and time ranges relevant to PSC leakage of information about labeled assets from the information flow analysis results.

The system generates a leakage model (step 112). Based on the PSCA vulnerability types being estimated, the system can refine the data isolated to signals relevant to PSC leakage into a leakage model. The system can extract characteristics from the design information and physical knowledge from other sources to further refine the leakage model, for example, by weighting by Hamming distances, weighting by magnitude of transitions, and more.

The system performs PSCA vulnerability diagnostics. Based on the leakage model, the system can extract PSCA vulnerabilities present in the design by quantifying one or more leakage criteria for the labeled assets.

Figure 2:
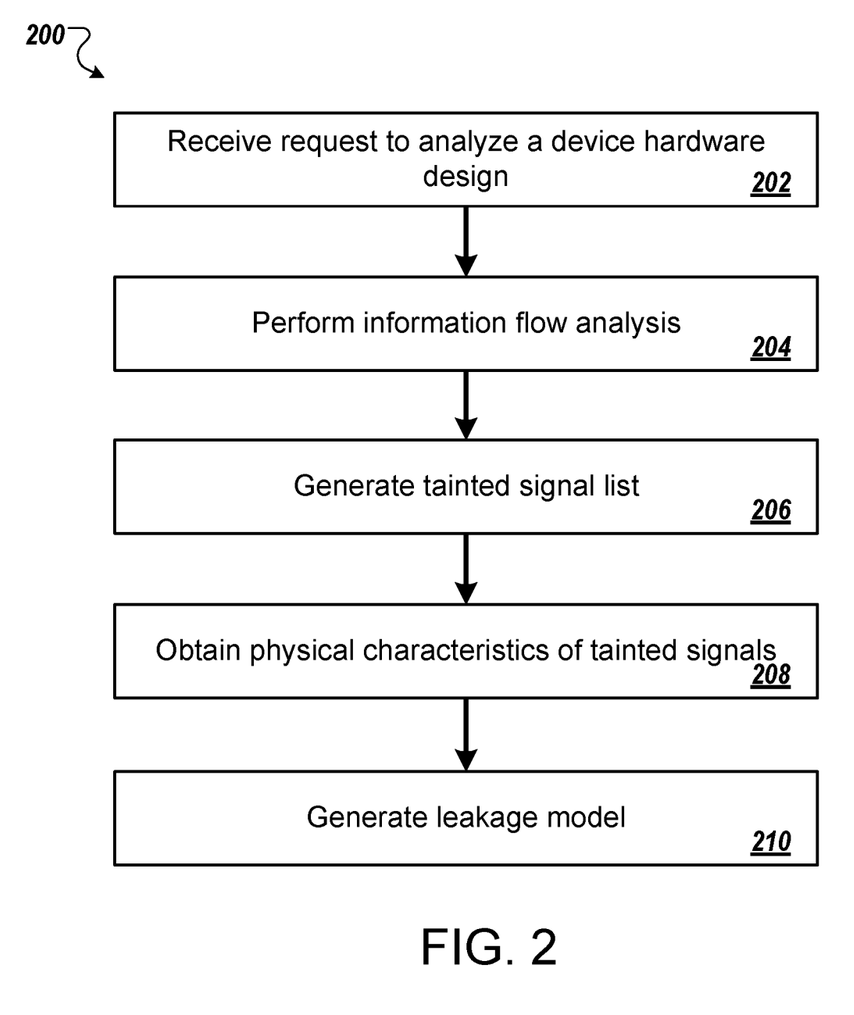
FIG. 2 is a flowchart of another example process 200 for generating a Leakage Model from physical design characteristics and information flow analysis.

FIG. 2 is a flowchart of another example process 200 for generating a Leakage Model from physical design characteristics and information flow analysis. FIG. 2 illustrates side-channel leakage detection using a list of signals and the times that information may flow as input to the measurement or estimation of design physical data, an example technique in which measuring the physical design characteristics is constrained by the information flow analysis. For convenience, the process will be described as being performed by a system of one or more computers.

The system receives a request to analyze a device hardware design (step 202) for side-channel vulnerabilities in the device after being manufactured.

The system performs information flow analysis (step 204). The system creates an information flow model for the design. The system can label assets of interest for PSCA vulnerability in the information flow model.

The system generates a tainted signal list (step 206). The system analyzes the information flow model to extract a list of what signals, over time, are carrying information from labeled assets. The temporal list of signals containing information flow may be referred to as the "tainted signal list."

The system obtains physical characteristics (step 208). The system gathers data, either an estimation or a collection of physical measurements ("traces"), about the signals in the tainted signal list. The tainted signal list is input during the data gathering to localize the data gathered to signals of interest for PSC leakage, rather than filtering the data after it is gathered as in FIG. 1. The data gathered is isolated to design signals and time ranges relevant to PSC leakage of information about labeled assets from the information flow analysis.

The system generates a leakage model (step 210). Based on the PSCA vulnerability types being estimated, the system can refine the data isolated to signals relevant to PSC leakage into a leakage model. The system can extract characteristics from the design information and physical knowledge from other sources to further refine the leakage model, for example, by weighting by Hamming distances, weighting by magnitude of transitions, and more.

The system performs PSCA vulnerability diagnostics. Based on the leakage model, the system can extract PSCA vulnerabilities present in the design by quantifying one or more leakage criteria for the labeled assets.

This information can then be used for various applications. For example, the system can then generate a user interface presentation that annotates parts of the design as being vulnerable to side-channel attacks, as well as trace information that indicates when the vulnerabilities occur. This kind of an automated tool can then be used by a user to evaluate the hardware design to determine when changes need to be made or to select from among multiple competing alternatives. In some implementations, the system can automatically rank different hardware designs according to a score generated from the PSCA vulnerabilities present in the design.

Figure 3A:
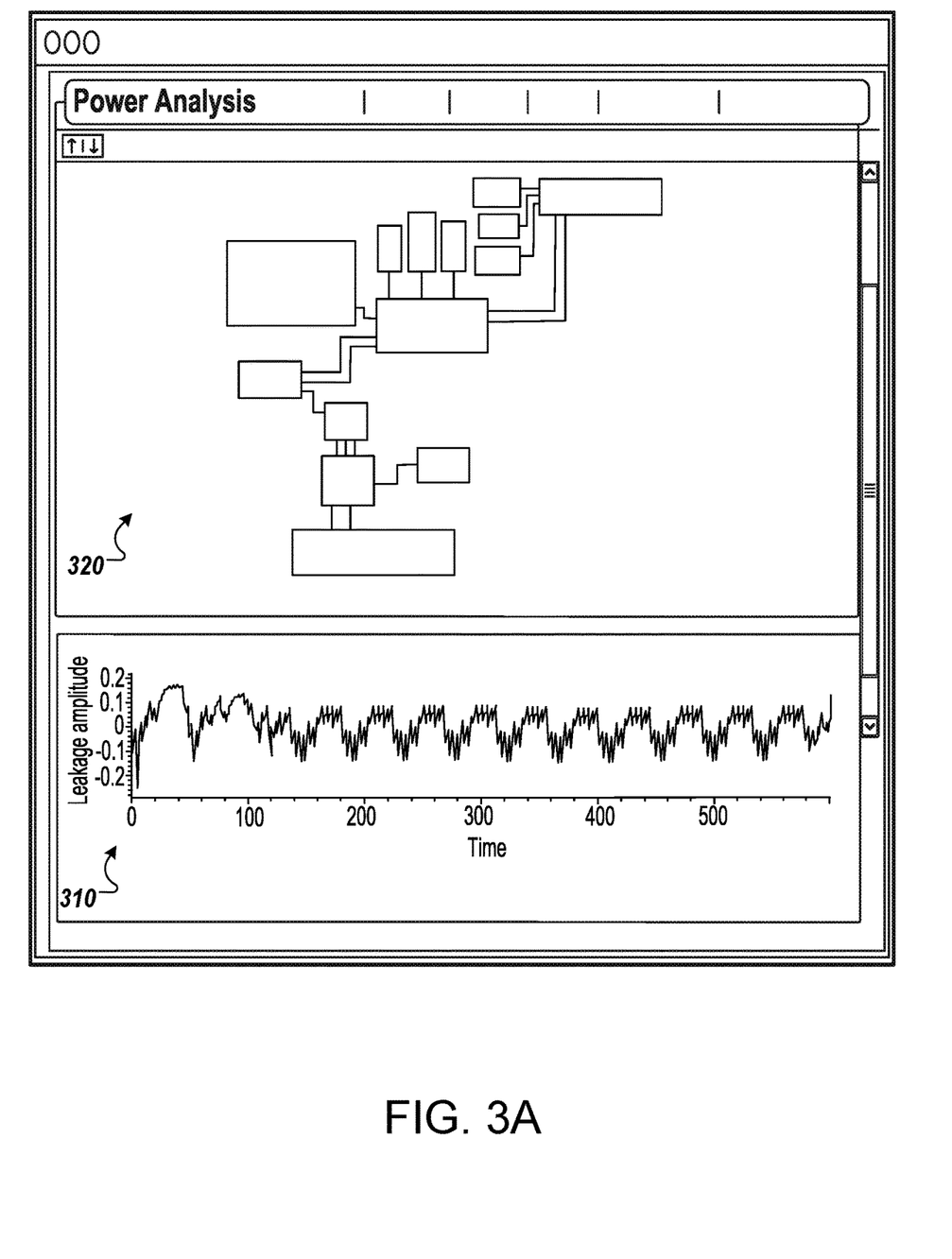
FIGS. 3A and 3B illustrate how a Leakage Model can be used to augment a user interface presentation.
Figure 3B:
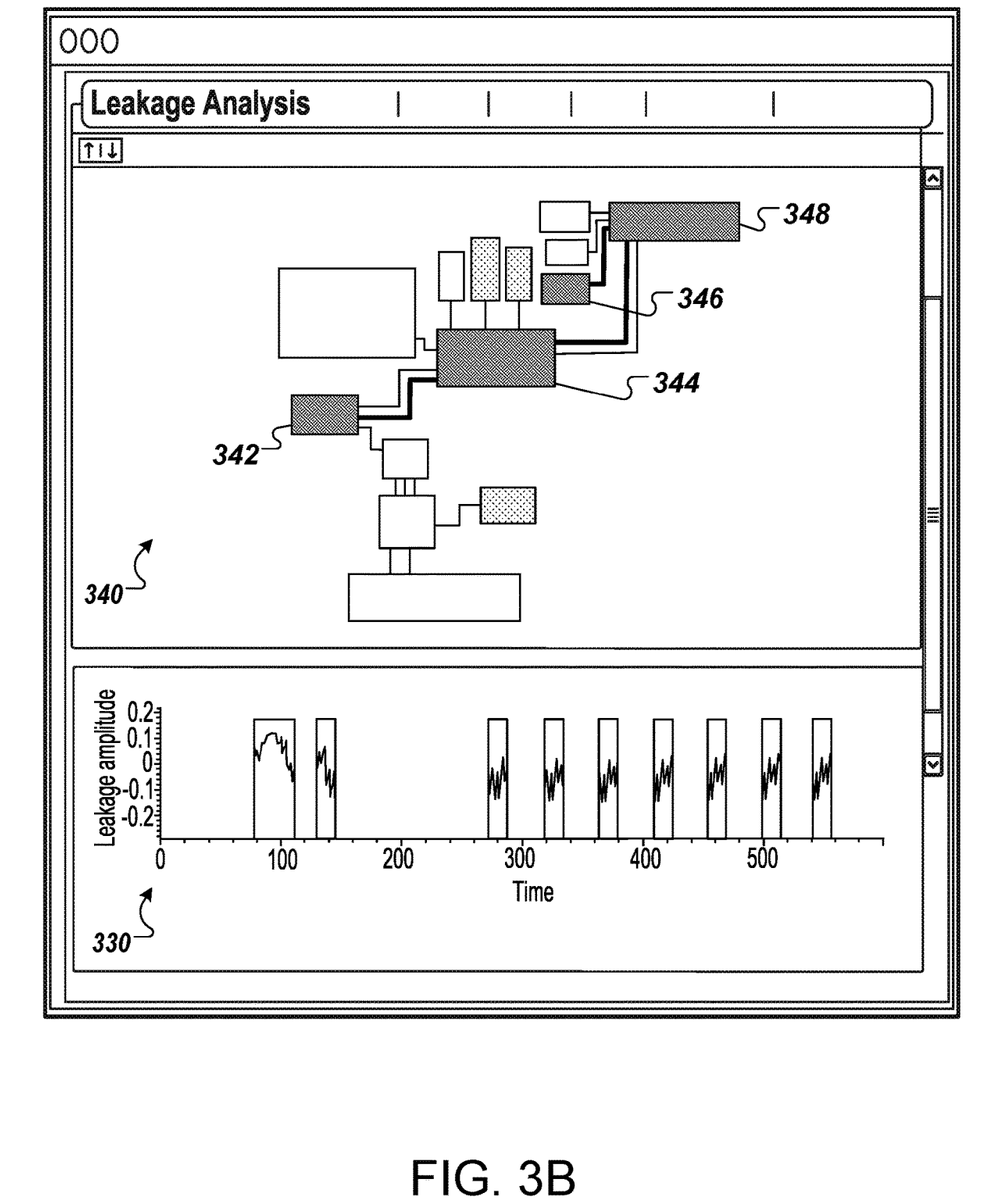

FIGS. 3A and 3B illustrate how a Leakage Model can be used to augment a user interface presentation.

FIG. 3A illustrates user interface presentation having two panes, a hardware design pane 320 and a physical characteristics pane 310. The physical characteristics pane 310 illustrates a trace of leakage amplitude for the hardware design illustrated in the hardware design page 320. It's apparent from this example that without taking information flow into consideration, elements of the hardware design that leak assets are difficult or impossible to determine. In addition, just from looking at the physical characteristics pane 310, the time window that leak assets are unknown.

FIG. 3B illustrates another user interface presentation. In this example, the system has used information flow analysis and physical characteristics of the hardware design to generate user interface presentation from a Leakage Model. The physical characteristics pane 330 now isolates specific time windows during which assets can be leaked. In addition, the hardware design pane 340 visually distinguishes elements of the hardware design 342, 344, 346, and 348, that are involved in the time windows during which assets can be leaked.

A hardware designer can thus use this information to very quickly identify vulnerabilities in the hardware design and can use this information to design countermeasures because the presentation provides a visual representation of vulnerabilities, e.g., visually distinguished isolated time windows. In addition, because the information flow analysis can be used to constrain or filter the physical characteristics that are analyzed, the annotations in the user interface presentation can themselves be computed very quickly, typically orders of magnitude faster than performing a physical simulation of all elements of the entire hardware design.

As can be seen from these examples, determining where and when side-channel leakage of design assets occurs can be a difficult task considering the amount of extraneous signals and data which may be present yet not contribute to the leakage of the asset of interest. Thus, using information flow analysis makes the task of identifying and detecting side-channel leakage of labeled assets easier and reveals where and when information related to the labeled assets flows through a design. The flow of information through a design indicates that the signals receiving information flowing from labeled assets will be of interest for identifying side-channel leakage.

When the information flow model is analyzed and it is determined which signals carry information from labeled assets at what times, the system can use that information to filter out information in the data which does not pertain to the list of signals and times determined to be relevant. This effectively isolates data which only contains information leakage from the labeled asset.

Isolating which signals and time ranges are relevant to the PSC leakage of information about labeled assets makes analysis and identification of PSC vulnerabilities much less complex, and therefore, requires fewer processing resources and time to compute.

The resulting dataset provides a filtered set of data that the system can use to create a Leakage Model. The Leakage Model can be generated from filtered data analyzing the design for PSCA vulnerabilities.

The Leakage Model is generic in the sense that certain characteristics from the filtered data may be used to create a Leakage Model that is more suited to analysis of different classes of PSC vulnerabilities. For example, the system can extract weighting coefficients from measured or simulated traces which are proportional to the magnitude of the physical effects underlying known PSCAs. The system can also weight coefficients based on rules of thumb or apply coefficients for exploratory purposes. For example, a leakage model can have coefficients correlated with the signals' Hamming distances between time points t and t−1.

For multi-bit assets that are secret, it can be relevant to determine how many bits influence or are "carried" by design signals at different points in time. For example, consider a cryptographic design, where the secret is a 128-bit key. A key step in architecting a side-channel attack for cryptographic key recovery is generating hypotheses for individual smaller subkeys. For example, it is generally impossible to create a table of hypotheses, or "guesses," modeling circuit behavior for each of the 2^128 possible keys, but it is feasible to create a table for key bytes, as there are only 256 possible key-byte values. If each byte of a 128-bit key can be recovered separately by comparing measurements from the target device to each of the 256 hypotheses then the total complexity of key recovery is 256×16 possible keys for key bytes, which is orders of magnitude less than 2^128 possible keys for key bits.

Because of the nature of cryptographic algorithms, all bits of the output (plaintext for decryption, ciphertext for encryption) depend on all key bits. To create hypotheses depending only on a subset of key bits, the attacker must identify intermediate points in the computation where internal signals only carry information from a subset of key bits.

Information flow tracking techniques can be used to compute how many key bits influence signals in the design at any point in time along with the specific key bits influencing the signal.

Such a methodology enables a defender to locate the hardware design signals most useful to an attacker and prioritize the application of countermeasures to these signals. A set of rules can be created in a hardware security language, where each rule tracks the propagation of a single key bit or subset of key bits. The union of all the tracked information flows for each rule reveals which subsets of key bits influence the signal over time.

The examples below are expressed in the Tortuga Logic Sentinel language, and show the security rules for bit and byte-level granularity. The Sentinel language is described in more detail in commonly-owned U.S. Pat. No. 10,289,873, which is incorporated herein by reference. Other techniques for using information flow are described in more detail in commonly-owned U.S. Pat. No. 10,558,771, which is incorporated herein by reference.

In the following examples, n represents a number of key bits.

Example 1: Bit-Level Granularity: n Security Rules

```
assert iflow (key[0] =/=> out);
assert iflow (key[1] =/=> out);
...
assert iflow (key[n-1] =/=> out);
```

Example 2: Byte-Level Granularity: n/8 Security Rules

```
assert iflow (key[7:0] =/=> out);
assert iflow (key[15:8] =/=> out);
...
assert iflow (key[n-1:n-8] =/=> out);
```

In further implementations, a system may, based on the results of the PSCA vulnerability diagnostics, automatically tune or modify a design's structure or characteristics. For example, the system can automatically insert logic which mitigates the vulnerabilities detected; modulate certain design characteristics such as clock speed or temperature throttling; or balance existing logic in the design to lessen the severity of the vulnerability.

In addition, in the case where a system measuring or estimating the physical data of a design can perform PSCA vulnerability analysis dynamically during measurement or estimation, the system can receive a tainted signal list to reduce the complexity of dynamically analyzing for PSCA vulnerabilities by constraining the dynamic analysis to the structural elements and times of interests from the tainted signal list.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request to analyze a device hardware design of a device for side-channel vulnerabilities;
obtaining physical characteristics data representing one or more physical characteristics of the device based on the device hardware design;
performing information flow analysis to identify one or more signals of interest corresponding to digital assets;
generating, from the physical characteristics data and the one or more signals of interest, data representing potentially vulnerable signals in the device hardware design including filtering the physical characteristics data of the device by the one or more signals of interest identified by the information flow analysis and by one or more time windows in which a signal of interest is present on one or more structures of the device hardware design; and
generating a leakage model for the potentially vulnerable signals that quantifies one or more leakage criteria for the one or more structures of the device hardware design.

2. The method of claim 1, wherein generating the data representing potentially vulnerable signals in the device hardware design comprises constraining a simulation of physical characteristics of the device hardware design according to the one or more signals of interest generated by the information flow analysis.

3. The method of claim 1, wherein the one or more leakage criteria includes a time window and a value for a physical characteristic of a signal.

4. The method of claim 1, further comprising generating a user interface presentation that annotates a representation of a hardware design having components that generate or receive the potentially vulnerable signals.

5. The method of claim 1, further comprising generating a user interface presentation that presents a time-windowed version of physical characteristics information for the one or more potentially vulnerable signals.

6. The method of claim 1, wherein one or more of the potentially vulnerable signals in the device hardware design correspond to single bits or portions of a byte.

7. A system comprising:
one or more computers and one or more storage devices storing instructions that are operable, when executed by the one or more computers, to cause the one or more computers to perform operations comprising:
receiving a request to analyze a device hardware design of a device for side-channel vulnerabilities;
obtaining physical characteristics data representing one or more physical characteristics of the device based on the device hardware design;
performing information flow analysis to identify one or more signals of interest corresponding to digital assets;
generating, from the physical characteristics data and the one or more signals of interest, data representing potentially vulnerable signals in the device hardware design including filtering the physical characteristics data of the device by the one or more signals of interest identified by the information flow analysis and by one or more time windows in which a signal of interest is present on one or more structures of the device hardware design; and
generating a leakage model for the potentially vulnerable signals that quantifies one or more leakage criteria for one or more structures of the device hardware design.

8. The system of claim 7, wherein generating the data representing potentially vulnerable signals in the device hardware design comprises constraining a simulation of physical characteristics of the device hardware design according to the one or more signals of interest generated by the information flow analysis.

9. The system of claim 7, wherein the one or more leakage criteria includes a time window and a value for a physical characteristic of a signal.

10. The system of claim 7, wherein the operations further comprise generating a user interface presentation that annotates a representation of a hardware design with components that generate or receive the potentially vulnerable signals.

11. The system of claim 7, wherein the operations further comprise generating a user interface presentation that presents a time-windowed version of physical characteristics information for the one or more potentially vulnerable signals.

12. The system of claim 7, wherein one or more of the potentially vulnerable signals in the device hardware design correspond to single bits or portions of a byte.

13. One or more non-transitory computer storage media encoded with computer program instructions that when executed by one or more computers cause the one or more computers to perform operations comprising:
receiving a request to analyze a device hardware design of a device for side-channel vulnerabilities;
obtaining physical characteristics data representing one or more physical characteristics of the device based on the device hardware design;
performing information flow analysis to identify one or more signals of interest corresponding to digital assets;
generating, from the physical characteristics data and the one or more signals of interest, data representing potentially vulnerable signals in the device hardware design including filtering the physical characteristics data of the device by the one or more signals of interest identified by the information flow analysis and by one or more time windows in which a signal of interest is present on one or more structures of the device hardware design; and
generating a leakage model for the potentially vulnerable signals that quantifies one or more leakage criteria for one or more structures of the device hardware design.

14. The one or more computer storage media of claim 13, wherein generating the data representing potentially vulnerable signals in the device hardware design comprises constraining a simulation of physical characteristics of the device hardware design according to the one or more signals of interest generated by the information flow analysis.

15. The one or more computer storage media of claim 13, wherein the one or more leakage criteria includes a time window and a value for a physical characteristic of a signal.

16. The one or more computer storage media of claim 13, wherein the operations further comprise generating a user interface presentation that annotates a representation of a hardware design having components that generate or receive the potentially vulnerable signals.

17. The one or more computer storage media of claim 13, wherein the operations further comprise generating a user interface presentation that presents a time-windowed version of physical characteristics information for the one or more potentially vulnerable signals.

18. The one or more computer storage media of claim 13, wherein one or more of the potentially vulnerable signals in the device hardware design correspond to single bits or portions of a byte.

* * * * *